United States Patent
Ju et al.

(10) Patent No.: US 7,060,321 B2
(45) Date of Patent: Jun. 13, 2006

(54) PROCESS FOR MANUFACTURING A TOP SPIN VALVE

(75) Inventors: Kochan Ju, Fremont, CA (US); Cheng Horng, San Jose, CA (US); Youfeng Zheng, San Jose, CA (US); Simon Liao, Fremont, CA (US); Jei-Wei Chang, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 11/011,994

(22) Filed: Dec. 14, 2004

(65) Prior Publication Data
US 2005/0094323 A1 May 5, 2005

Related U.S. Application Data

(62) Division of application No. 09/696,134, filed on Oct. 26, 2000, now Pat. No. 6,885,527.

(51) Int. Cl.
*B05D 5/12* (2006.01)
*G11B 5/84* (2006.01)

(52) U.S. Cl. .................. 427/131; 427/128; 29/603.13; 29/603.14

(58) Field of Classification Search .............. 427/127, 427/128, 131; 360/324, 324.1, 324.11, 324.12; 29/603.13, 603.14
See application file for complete search history.

(56) References Cited

U.S. PATENT DOCUMENTS

| | | | | |
|---|---|---|---|---|
| 5,422,571 A * | 6/1995 | Gurney et al. | ............... | 324/252 |
| 5,452,163 A * | 9/1995 | Coffey et al. | ............... | 360/324 |
| 5,574,605 A * | 11/1996 | Baumgart et al. | ..... | 360/324.11 |
| 5,608,593 A | 3/1997 | Kim et al. | .................... | 360/113 |
| 5,668,688 A | 9/1997 | Dykes et al. | ................ | 360/113 |
| 5,777,542 A | 7/1998 | Ohsawa et al. | ........... | 338/32 R |
| 5,828,527 A | 10/1998 | Takada et al. | ............... | 360/113 |
| 5,978,182 A | 11/1999 | Kanai et al. | ................. | 360/113 |
| 5,999,379 A | 12/1999 | Hsiao et al. | ................. | 360/113 |
| 6,175,476 B1 * | 1/2001 | Huai et al. | ............. | 360/324.11 |
| 6,228,276 B1 | 5/2001 | Ju et al. | ........................ | 216/22 |

OTHER PUBLICATIONS

U.S. Patent Appl. HT-98-024/025 filed Sep. 30, 1999, U.S. Appl. No. 09/408,492 now issued as U.S. Patent 6,385,017 to Min et al., filed May 7, 1992.

(Continued)

*Primary Examiner*—Brian K. Talbot
(74) *Attorney, Agent, or Firm*—Saile Ackerman LLC; Stephen B. Ackerman (57) ABSTRACT

Currently, the shield-to-shield separation of a spin valve head cannot be below about 800 Å, mainly due to sensor-to-lead shorting problems. This problem has now been overcome by inserting a high permeability, high resistivity, thin film shield on the top or bottom (or both) sides of the spin valve sensor. A permeability greater than about 500 is required together with a resistivity about 5 times greater than that of the free layer and an $M_rT$ value for the thin film shield that is 4 times greater than that of the free layer. Five embodiments of the invention are described.

4 Claims, 7 Drawing Sheets

OTHER PUBLICATIONS

"Greater Than 14Gb/in$^2$ Spin Valve heads", H.C. Tong et al., IEEE Trans. on Magnetics, vol. 35, No. 5, Sep. 1999, pp. 2574-2579.

"Readback Signal Comparison Between DMSR & SAL/MR Heads", Yimin Guo et al., IEEE Trans. on Magnetics, vol. 32, No. 5, Sep. 1996, pp. 3437-3439.

* cited by examiner

PROCESS FOR MANUFACTURING A TOP SPIN VALVE

This is a division of patent application Ser. No. 09/696,134, filing date Oct. 26, 2000, now issued as U.S. Pat. No. 6,885,527, Integrated Spin Valve Head, assigned to the same assignee as the present invention which is herein incorporated by reference in its entirety.

FIELD OF THE INVENTION

The invention relates to the general field of magnetic recording with particular reference to improving linear resolution.

BACKGROUND OF THE INVENTION

The present invention is concerned with the manufacture of the read element in a magnetic disk system. This is a thin slice of material located between two magnetic shields which we will refer to a primary shields. The principle governing operation of the read sensor is the change of resistivity of certain materials in the presence of a magnetic field (magneto-resistance). In particular, most magnetic materials exhibit anisbtropic behavior in that they have a preferred direction along which they are most easily magnetized (known as the easy axis). The magneto-resistance effect manifests itself as a decrease in resistivity when the material is magnetized in a direction perpendicular to the easy axis, said decrease being reduced to zero when magnetization is along the easy axis. Thus, any magnetic field that changes the direction of magnetization in a magneto-resistive material can be detected as a change in resistance.

It is now known that the magneto-resistance effect can be significantly increased by means of a structure known as a spin valve (SV). The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole.

The key elements of a spin valve structure are two magnetic layers separated by a non-magnetic layer. The thickness of the non-magnetic layer is chosen so that the magnetic layers are sufficiently far apart for exchange effects to be negligible (the layers do not influence each other's magnetic behavior at the atomic level) but are close enough to be within the mean free path of conduction electrons in the material. If, now, these two magnetic layers are magnetized in opposite directions and a current is passed through them along the direction of magnetization, half the electrons in each layer will be subject to increased scattering while half will be unaffected (to a first approximation). Furthermore, only the unaffected electrons will have mean free paths long enough for them to have a high probability of crossing the non magnetic layer. However, once these electron 'switch sides', they are immediately subject to increased scattering, thereby becoming unlikely to return to their original side, the overall result being a significant increase in the resistance of the entire structure.

In order to make use of the GMR effect, the direction of magnetization of one the layers must be permanently fixed, or pinned. Pinning is achieved by first magnetizing the layer (by depositing and/or annealing it in the presence of a magnetic field) and then permanently maintaining the magnetization by over coating with a layer of antiferromagnetic material. The other layer, by contrast, is a "free layer" whose direction of magnetization can be readily changed by an external field (such as that associated with a bit at the surface of a magnetic disk).

Structures in which the pinned layer is at the top are referred to as top spin valves. Similarly, It is also possible to form a 'bottom spin valve' structure where the pinned layer is deposited first. Although not directly connected to the GMR effect, an important feature of spin valve structures is a pair of longitudinal bias stripes that are permanently magnetized in a direction parallel to the long dimension of the device. Their purpose is to prevent the formation of multiple magnetic domains in the free layer portion of the GMR sensor, particularly near its ends.

Figure 1:
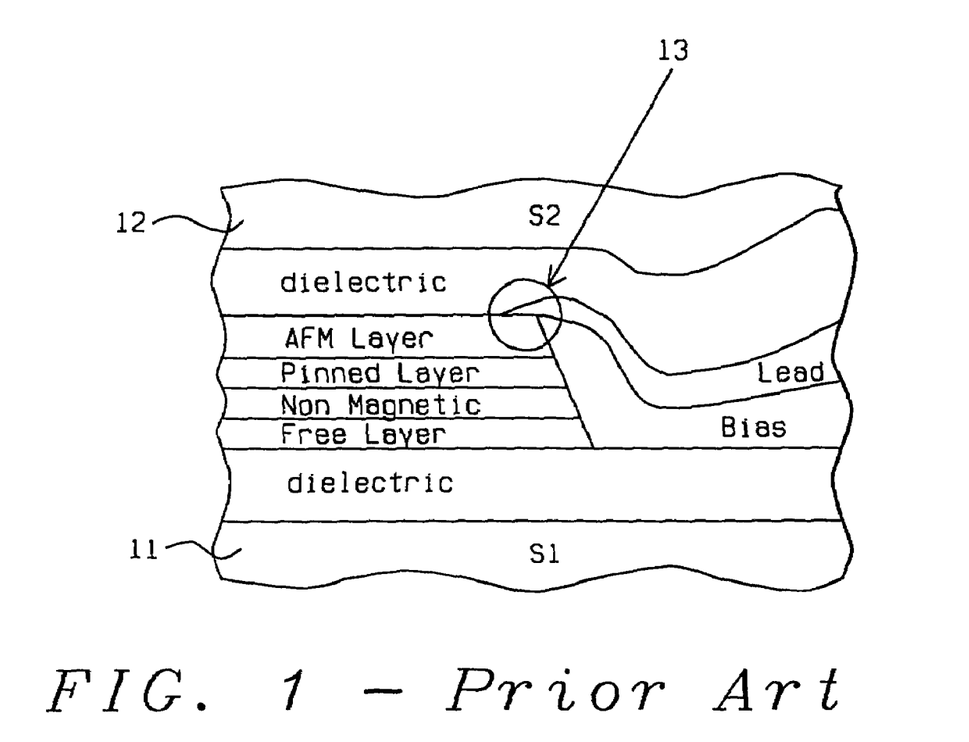
FIG. 1 shows how a structure made according to earlier teachings is subject to shorting (through the dielectric layer that insulated the shield from the sensor) if made too thin.

FIG. 1 shows a typical structure that embodies the features described above. As noted above, the device is sandwiched between two primary shields 11 and 12. Currently, the shield-to-shield separation of a spin valve head cannot be below about 800 Å, mainly due to the sensor-to-shield shorting problem. This is pointed to in the figure by arrow 13. Since improvements in the density of recorded data require that this distance be reduced below 800 Å, there is a need for a structure (and a process for manufacturing it) that is not susceptible to said shorting problem.

An application that describes a structure that is related to that disclosed by the present invention was filed on Sep. 30, 1999 as application Ser. No. 09/408,492. Additionally, a routine search of the prior art was performed and the following references of interest were found:

In U.S. Pat. No. 5,978,182, Kanai et al. show a SV with a first soft magnetic layer. In U.S. Pat. No. 5,608,593, Kim et al. shows a SV with a non-magnetic (e.g., Cr) under-layer. Takada et al show a stabilizing layer with an under-layer of Cr and a hard magnetic layer in U.S. Pat. No. 5,828,527, while Ohsawa et al. (U.S. Pat. No. 5,777,542), Dykes et al. (U.S. Pat. No. 5,668,688), and Hsiao et al. (U.S. Pat. No. 5,999,379) all show related SV devices with shield layers.

SUMMARY OF THE INVENTION

It has been an object of the present invention to provide a spin valve structure that is free of internal electrical shorting by maintaining a relatively large shield-to-shield spacing while continuing to obtain very narrow feedback pulse widths.

Another object of the invention has been to provide a process for manufacturing said spin valve structure.

A further object has been that said structure be given its longitudinal bias through either permanent magnet or exchange magnet means.

A still further object has been that said structure be either a top or a bottom spin valve.

These objects have been achieved by inserting a high permeability, high resistivity, thin film shield on the top or bottom (or both) sides of the spin valve sensor. A permeability greater than about 500 is required together with a resistivity about 5 times greater than that of the free layer and an $M_rT$ value for the thin film shield that is 4 times greater than that of the free layer. Five embodiments of the invention are described.

DESCRIPTION OF THE PREFERRED EMBODIMENTS

As already noted above, present SV designs cannot have their shield-to-shield spacing thicknesses reduced below about 800 Å because of shorting through the dielectric insulating coverage over the conductor lead. In dual stripe MR structures, it has been observed that if one of the MR stripes is not performing correctly, the signal contribution is dominated by the other MR, so that the read back pulse width, $PW_{50}$, is reduced. $PW_{50}$ is the pulse width measured at the 50% of amplitude point (in nanoseconds or nanometers). It is measured at low frequency to avoid interference between adjacent pulses.

The present invention solves this problem by the insertion of a high permeability, high resistivity thin film shield on the top or bottom (or both) sides of the spin valve sensor. Examples of materials suitable for the thin film shields include (but are not limited to) nickel-iron-chromium, cobalt-niobium-zirconium, and cobalt-niobium-hafnium. We now describe five embodiments of the present invention. Although each embodiment is described in terms of the process for its manufacture, the structure of each embodiment will become apparent as each manufacturing process is disclosed. The following compositions and thickness ranges are common to all embodiments:

TABLE I

| LAYER | COMPOSITION | THICKNESS (Å) |
| --- | --- | --- |
| free | $Co_{90}Fe_{10}$, $Ni_8Fe_{19}$ | 5–50 |
| non-magnetic spacer | Cu | 12–22 |
| pinned | $Co_{90}Fe_{10}$ | 10–30 |
| pinning | $Ni_{45}Mn_{55}$, $Mn_{50}Pt_{50}$ | 80–200 |
| dielectric | $Al_2O_3$, AlN | 100–200 |
| Thin film shield | NiFeCr, CoZrNb, CoHfNb, CoZrHf, CoFeX (X = Cr, N, Ta, Ti) | 50–400 |
| decoupling | TaO, NiCr, NiFeCr | 20–50 |

First Embodiment

This process is for manufacturing a top spin valve structure. It begins with the provision the first (lower) of the two primary magnetic shields. This can be seen as layer 15 in FIG. 2 on which dielectric layer 17 is deposited, followed by the deposition of free layer 21. This is followed by the deposition of non-magnetic layer 22 onto which is deposited pinned layer 23. Next, onto pinned layer 23 there is deposited anti-ferromagnetic layer 24 for use as a pinning layer. This completes formation of the spin valve itself.

Figure 2:
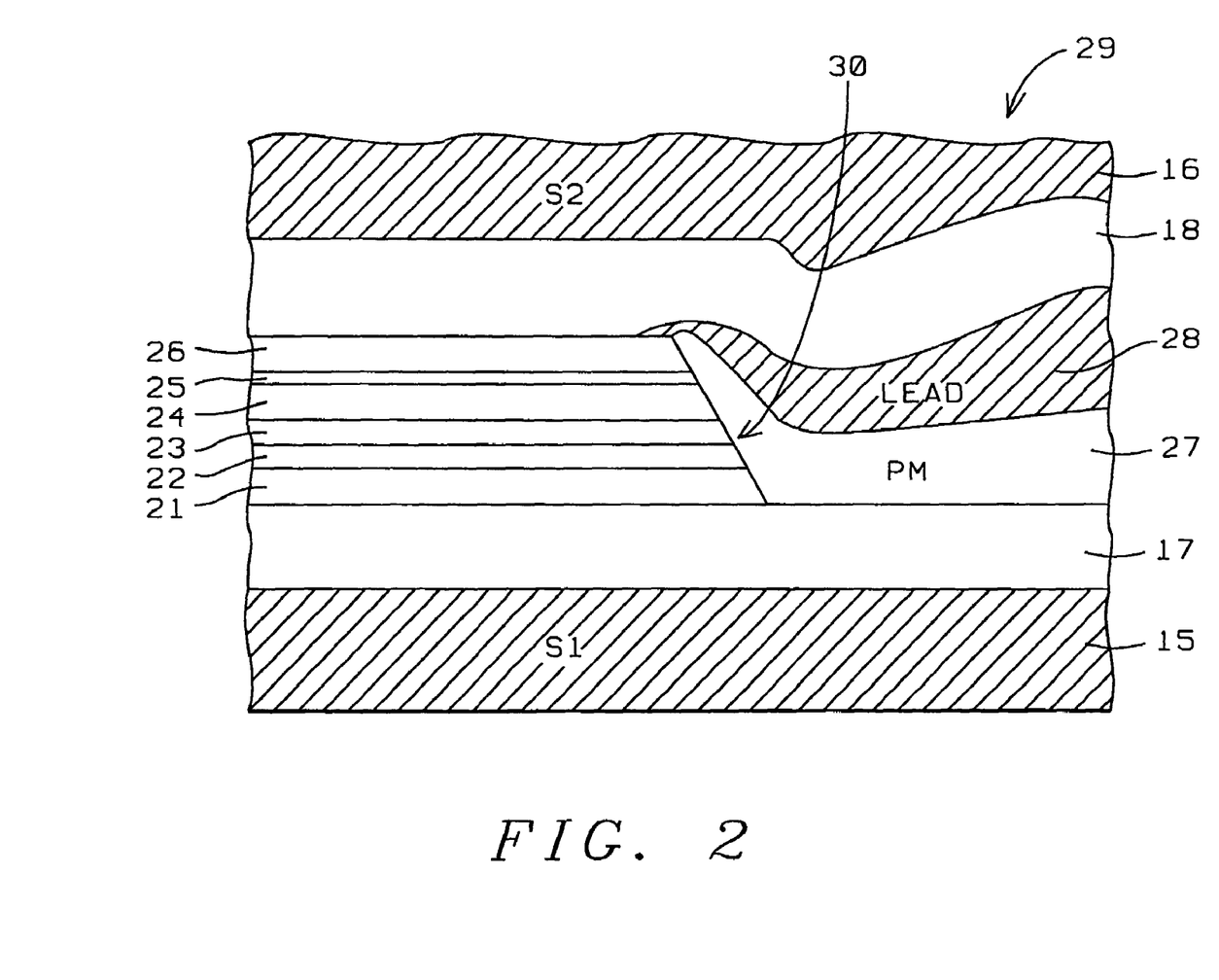
FIGS. 2 and 3 show bottom spin valve structures with permanent magnet biasing, having a single thin film shield, as taught by the present invention.

Now follows a key feature of the invention. On anti-ferromagnetic layer 24, decoupling layer 25 is deposited, followed by the deposition of thin film shield 26. The purpose of the decoupling layer is to avoid any exchange coupling of the thin film shield by layer 24. The thin film shield is a layer of ferromagnetic material having a permeability greater than about 500. It needs to have as high an electrical resistivity as possible within other constraints of the structure. It is required to be at least 5 times more resistive than the free layer. Since the latter is about 25 micro-ohm-cm, a value greater than about 125 micro-ohm-cm is to be preferred. The thickness of the thin film shield should be such that the moment-thickness product (of the thin film shield) is 2–5 times that of the free layer. The presence of this thin film shield allows relatively thicker dielectric layers to be used, thereby reducing or eliminating the chances of shorting, while still being able to obtain very narrow feedback pulse widths (namely $PW_{50}$).

To initiate completion of the structure, trench 29 is formed using conventional patterning and etching. This trench extends through thin film shield 26 down as far as the top surface of dielectric layer 17. The trench has a sidewall 30 that slopes at an angle of about 20 degrees. Onto this sidewall, as well as the exposed surface of dielectric layer 17, is selectively deposited layer 27 of a ferromagnetic material (such as CoCrPt) that is suitable for use as a permanent magnet, the direction of permanent magnetization being set by a field that is present during or after deposition of the layer. Layer 27 will serve to provide longitudinal bias to the structure, as discussed earlier.

With layer 27 in place, a layer of conductive material 28, suitable for use as a connecting lead to the structure, is selectively deposited thereon. This is followed by the deposition of second dielectric layer 18 onto which is deposited upper primary magnetic shield 16.

Second Embodiment

Figure 3:
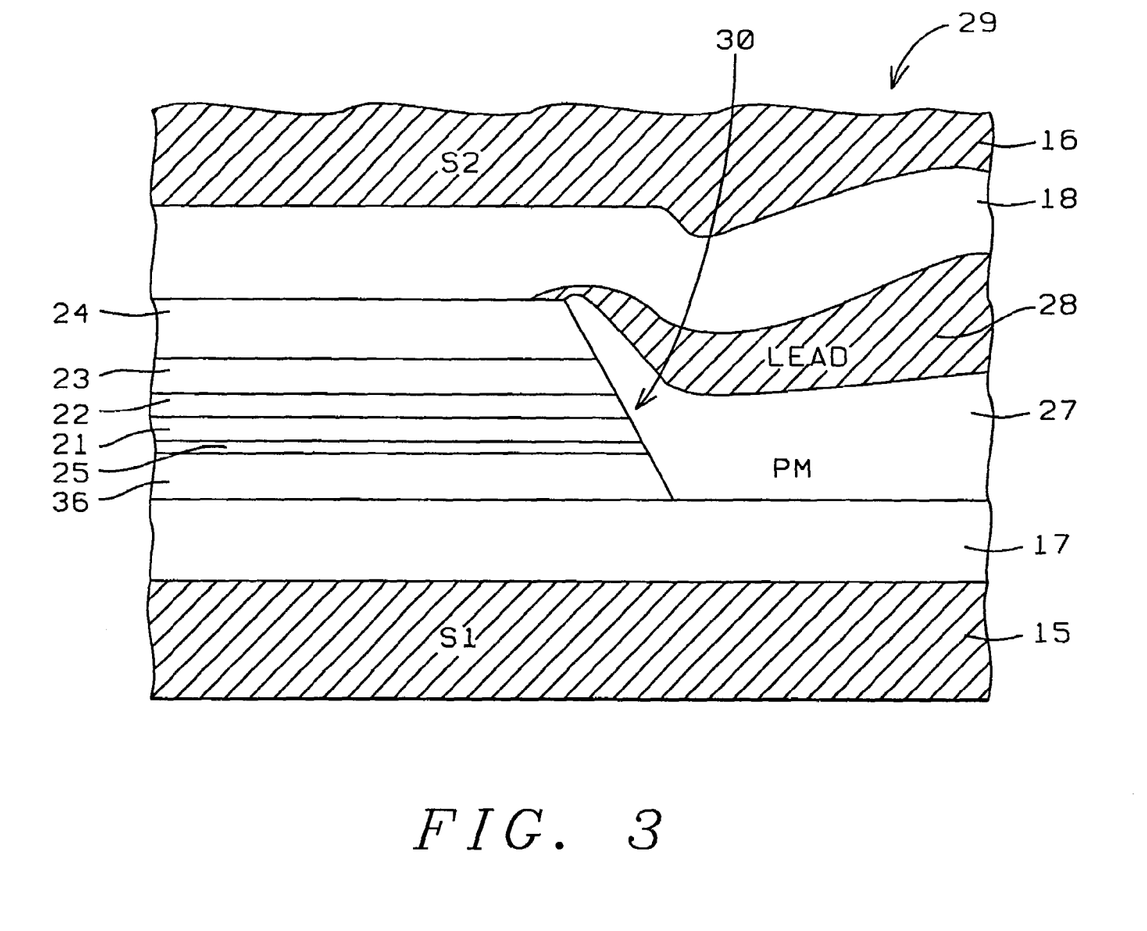

This process is also for manufacturing a top spin valve structure. Referring now to FIG. 3, this embodiment begins with the provision of the first (lower) of the two primary magnetic shields 15 on which dielectric layer 17 is deposited. Now follows a key feature of the invention, namely the deposition of thin film shield 36. The thin film shield is a layer of high permeability (greater than about 500) ferromagnetic material. It needs to have as high an electrical resistivity as possible within other constraints of the structure. It is required to be at least 5 times more resistive than the free layer. Since the latter is about 25 micro-ohm-cm, a value greater than about 125 micro-ohm-cm is to be preferred. The thickness of the thin film shield should be such that the moment-thickness product (of the thin film shield) is 2–5 times that of the free layer. The presence of this thin film shield allows relatively thicker dielectric layers to be used, thereby reducing or eliminating the chances of shorting, while still being able to obtain very narrow feedback pulse widths.

With the thin film shield in place, decoupling layer 25 is laid down followed by the deposition of free layer 21. This is followed by the deposition of non-magnetic layer 22 onto which is deposited pinned layer 23. Next, onto pinned layer 23 there is deposited anti-ferromagnetic layer 24 for use as a pinning layer. This completes formation of the spin valve itself.

Completion of the structure then continues with the formation of trench 29, using conventional patterning and etching. This trench extends through layer 24 down as far as the top surface of dielectric layer 17. The trench has a sidewall 30 that slopes at an angle of about 20 degrees. Onto this sidewall, as well as the exposed surface of dielectric layer 17, is selectively deposited layer 27 of a ferromagnetic material (such as CoCrPt) that is suitable for use as a permanent magnet, the direction of permanent magnetization being set by a field that is present during deposition of the layer or by later annealing in such a field. Layer 27 will serve to provide longitudinal bias to the structure, as discussed earlier.

With layer 27 in place, a layer of conductive material 28, suitable for use as a connecting lead to the structure, is selectively deposited thereon. This is followed by the deposition of second dielectric layer 18 onto which is deposited upper primary magnetic shield 16.

Third Embodiment

This process is also for manufacturing a top spin valve structure. We refer now to FIG. 4 which begins with the provision of the first (lower) of the two primary magnetic shields 15 onto which is deposited dielectric layer 17. Then, on a selected area at the surface of layer 17, a layer of conductive material 47, suitable for use as a connecting lead to the structure, is deposited. Then, on layer 47 only, layer 48 of a ferromagnetic material suitable for use as an exchange magnet is deposited. This will serve to provide the needed longitudinal bias for the structure, as discussed above.

Figure 4:
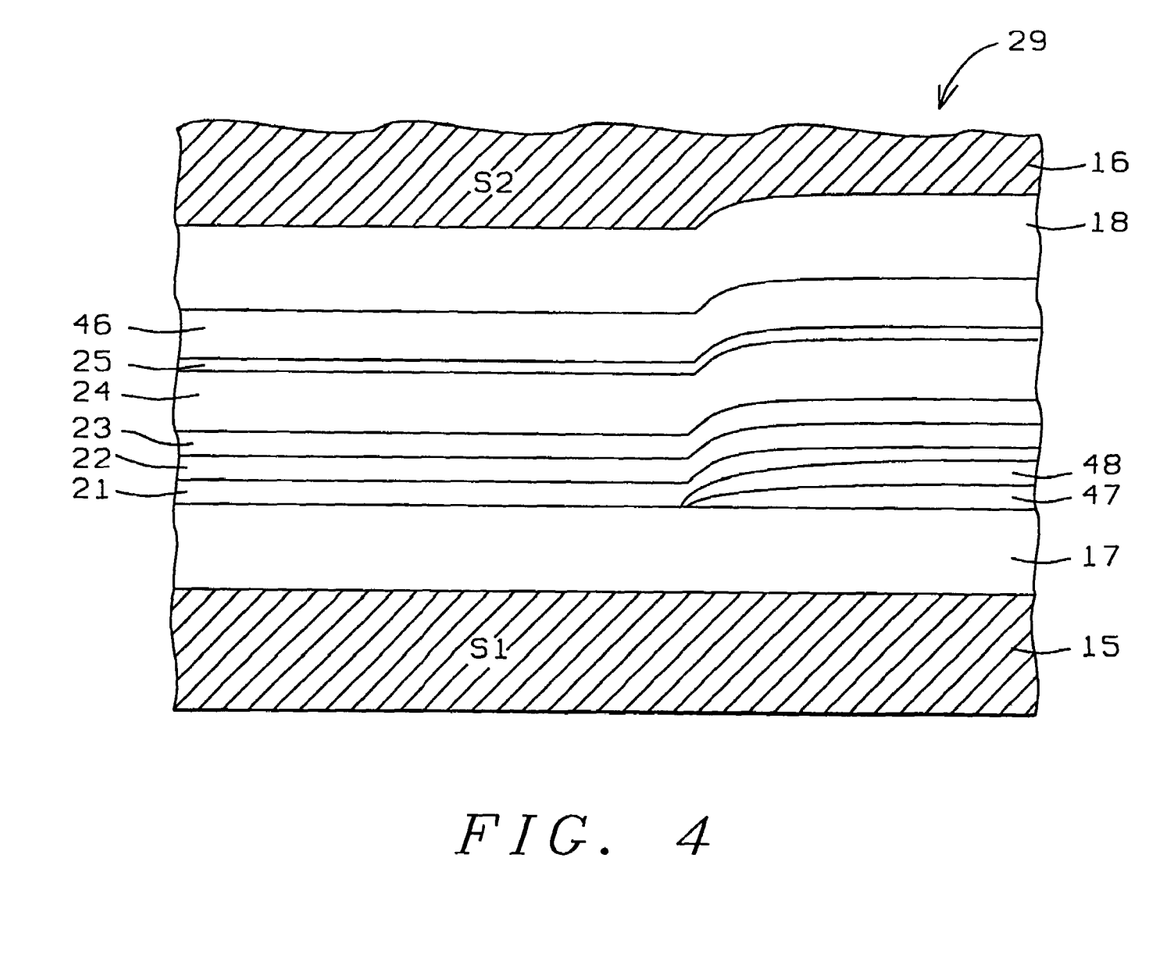
FIG. 4 shows a bottom spin valve structure with exchange magnet biasing, having a single thin film shield, as taught by the present invention.

Then, free layer 21 is deposited over the full surface followed by the deposition of non-magnetic layer 22 onto which is deposited pinned layer 23. Next, onto pinned layer 23 there is deposited anti-ferromagnetic layer 24 for use as a pinning layer.

Now follows a key feature of the invention. On anti-ferromagnetic layer 24, decoupling layer 25 is deposited, followed by the deposition of thin film shield 46. The purpose of the decoupling layer is to avoid any pinning of the thin film shield by layer 24. The thin film shield is a layer of high permeability (greater than about 500) ferromagnetic material. It needs to have as high an electrical resistivity as possible within other constraints of the structure. It is required to be at least 5 times more resistive than the free layer. Since the latter is about 25 micro-ohm-cm, a value greater than about 125 micro-ohm-cm is to be preferred. The presence of this thin film shield allows a relatively large shield-to-shield spacing to be maintained (thereby reducing or eliminating the chances of shorting) while still being able to obtain very narrow feedback pulse widths.

Since the lead and biasing structure is already in place, all that remains to complete this embodiment is the deposition of second dielectric layer 18 onto which is deposited upper primary magnetic shield 16.

Fourth Embodiment

Figure 5:
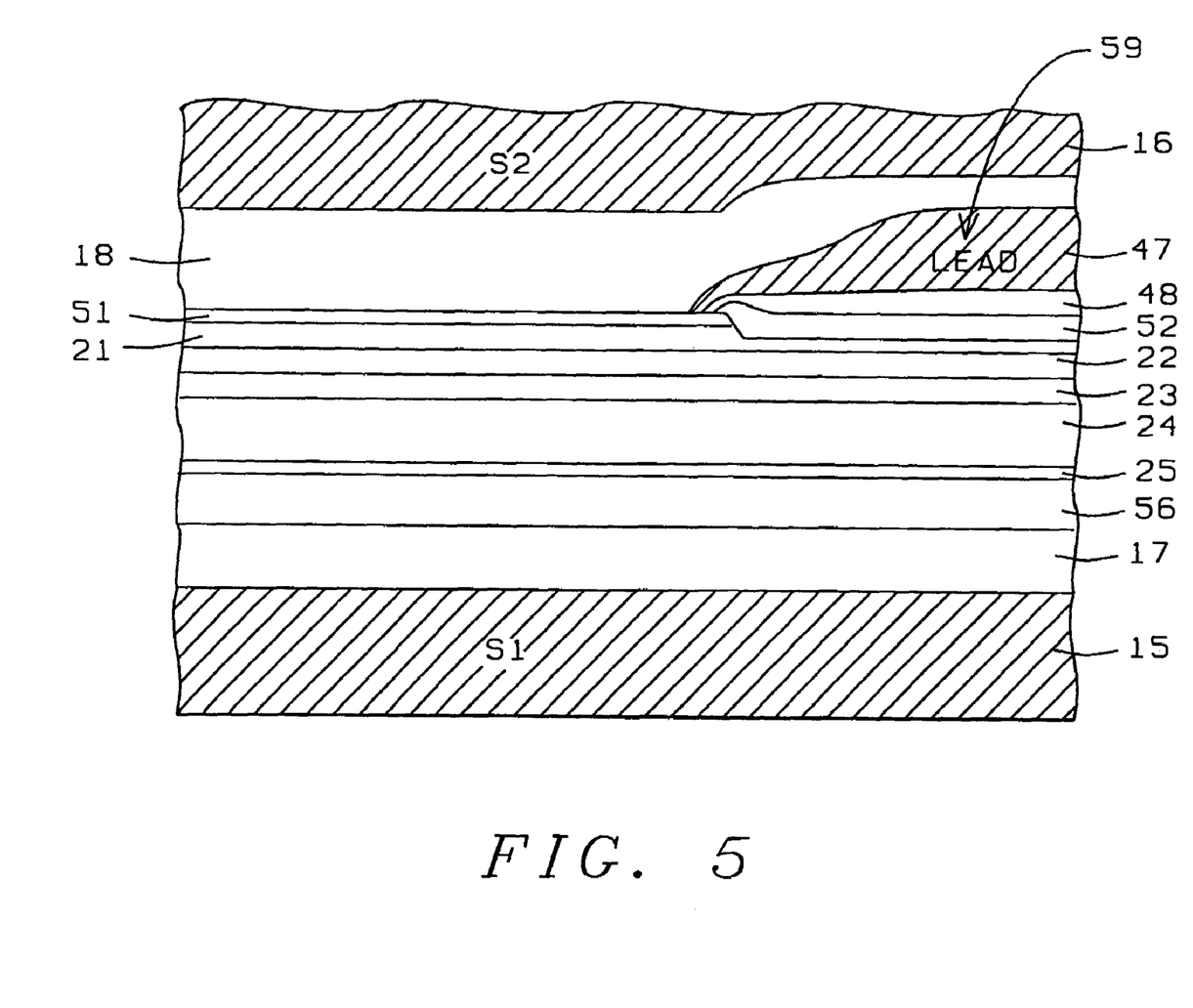
FIG. 5 shows a top spin valve structure with exchange magnet biasing, having a single thin film shield, as taught by the present invention.

Unlike the previous three embodiments, this process is for manufacturing a bottom spin valve structure. Referring to FIG. 5, it begins, as before, with the provision of the first (lower) of the two primary magnetic shields 15 onto which dielectric layer 17 is deposited. A key feature of the invention now follows, namely the deposition of thin film shield 56. The thin film shield is a layer of high permeability (greater than 500) ferromagnetic material. It needs to have as high an electrical resistivity as possible within other constraints of the structure. It is required to be at least 5 times more resistive than the free layer. Since the latter is about 25 micro-ohm-cm, a value greater than about 125 micro-ohm-cm is to be preferred. The thickness of the thin film shield should be such that the moment-thickness product (of the thin film shield) is 2–5 times that of the free layer. The presence of this thin film shield allows relatively thicker dielectric layers to be used, thereby reducing or eliminating the chances of shorting, while still being able to obtain very narrow feedback pulse widths (namely $PW_{50}$).

With the thin film shield in place, decoupling layer 25 is laid down followed by the deposition of anti-ferromagnetic layer 24. This is followed by the deposition of pinned layer 23 onto which is deposited non-magnetic layer 22. Next, onto non-magnetic layer 22 there is deposited free layer 21 which completes formation of the spin valve itself.

To initiate completion of the structure, shallow trench 59 is formed using conventional patterning and etching. This trench extends part way through the free layer 21. On the part of the free layer that lies outside the trench, capping layer 51 of tantalum, tantalum oxide, and alumina, among others, is deposited. Its purpose is to provide protection against oxidation or other forms of contamination. On the part of the free layer that forms the base of the trench, refill layer 52 of the same material as used for the free layer (typically permalloy).

Layer 48, comprising a ferromagnetic material suitable for use as an exchange magnet is then selectively deposited onto the trench base portion of layer 21 where it will provide longitudinal bias to the structure. Then, layer 47 of conductive material suitable for use in connecting leads to the structure is selectively deposited onto exchange magnet layer 48. To complete this embodiment, second dielectric layer 18 is deposited onto layers 47 and 51 followed by the overall deposition of upper primary magnetic shield 16.

Fifth Embodiment

The process of this embodiment is also for manufacturing a top spin valve structure but, unlike the previous four embodiments, it makes use of two thin film shields. While adding slightly to the overall thickness, the two shield structure has the advantage that, since $PW_{50}$ is defined by the distance between these two shields, even narrower pulse widths can be obtained. Note also that this scheme is not limited to conventional spin-valve structures. It is also readily applicable to synthetic anti-ferromagnet SVs and Dual-SV applications.

Figure 6:
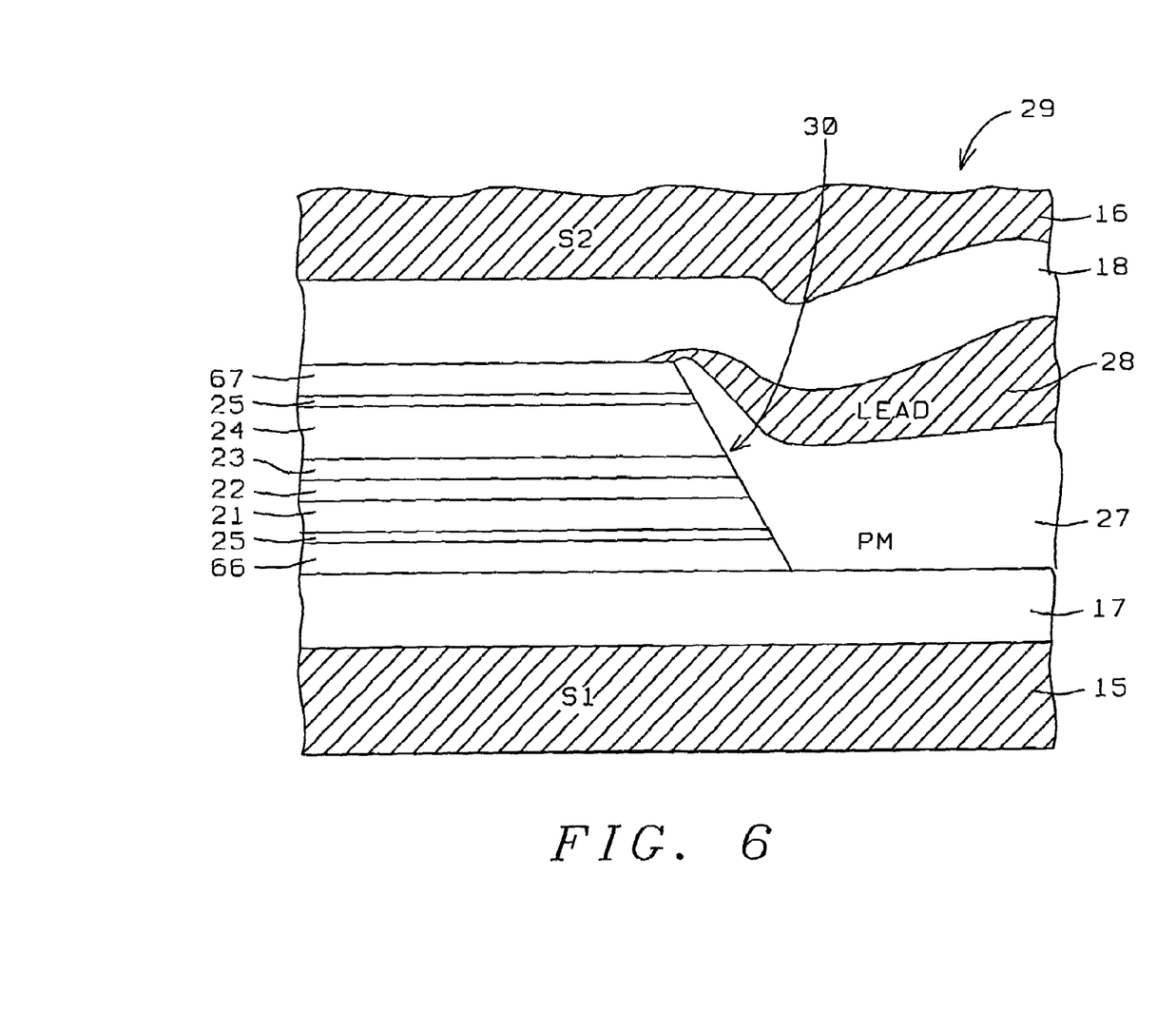
FIG. 6 shows a bottom spin valve structure with permanent magnet biasing, having two thin film shields, as taught by the present invention.

Referring now to FIG. 6, this embodiment begins with the provision of the first (lower) of the two primary magnetic shields 15 on which dielectric layer 17 is deposited. Now follows a key feature of the invention, namely the deposition of thin film shield 66. The thin film shield is a layer of high permeability (greater than 500) ferromagnetic material. It needs to have as high an electrical resistivity as possible within other constraints of the structure. It is required to be at least 5 times more resistive than the free layer. Since the latter is about 25 micro-ohm-cm, a value greater than about 125 micro-ohm-cm is to be preferred. The thickness of the thin film shield should be such that the moment-thickness product (of the thin film shield) is 2–5 times that of the free layer. The presence of this thin film shield allows relatively thicker dielectric layers to be used, thereby reducing or eliminating the chances of shorting, while still being able to obtain very narrow feedback pulse widths (namely $PW_{50}$).

With the thin film shield in place, decoupling layer 25 is laid down followed by the deposition of free layer 21. This is followed by the deposition of non-magnetic layer 22 onto which is deposited pinned layer 23. Next, onto pinned layer 23 there is deposited anti-ferromagnetic layer 24 for use as a pinning layer.

Now follows another key feature of the invention. On anti-ferromagnetic layer 24, decoupling layer 25 is deposited, followed by the deposition of a second thin film shield 67. The second thin film shield has the same properties as the first thin film shield. The presence of the thin film shields allows a relatively large shield-to-shield spacing to be maintained (thereby reducing or eliminating the chances of shorting) while still being able to obtain very narrow feedback pulse widths.

To initiate completion of the structure, trench 29 is formed using conventional patterning and etching. This trench extends through thin film shield 67 down as far as the top surface of dielectric layer 17. The trench has a sidewall 30 that slopes at an angle of about 20 degrees. Onto this sidewall, as well as the exposed surface of dielectric layer 17, is selectively deposited layer 27 of a ferromagnetic material (such as CoCrPt) that is suitable for use as a permanent magnet, the direction of permanent magnetization being set by a field that is present during deposition of the layer or by later annealing in such a field. Layer 27 will serve to provide longitudinal bias to the structure, as discussed earlier.

With layer 27 in place, a layer of conductive material 28, suitable for use as a connecting lead to the structure, is selectively deposited thereon. This is followed by the deposition of second dielectric layer 18 onto which is deposited upper primary magnetic shield 16.

Figure 7:
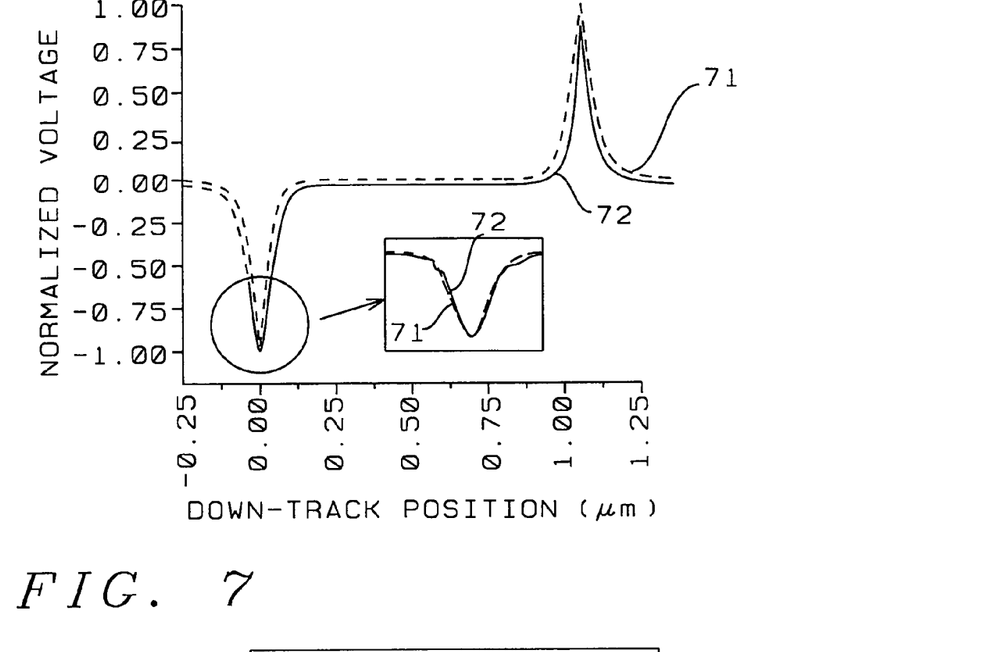
FIG. 7 compares read back signal pulse shape for structures with and without the thin film shield.
Figure 8:
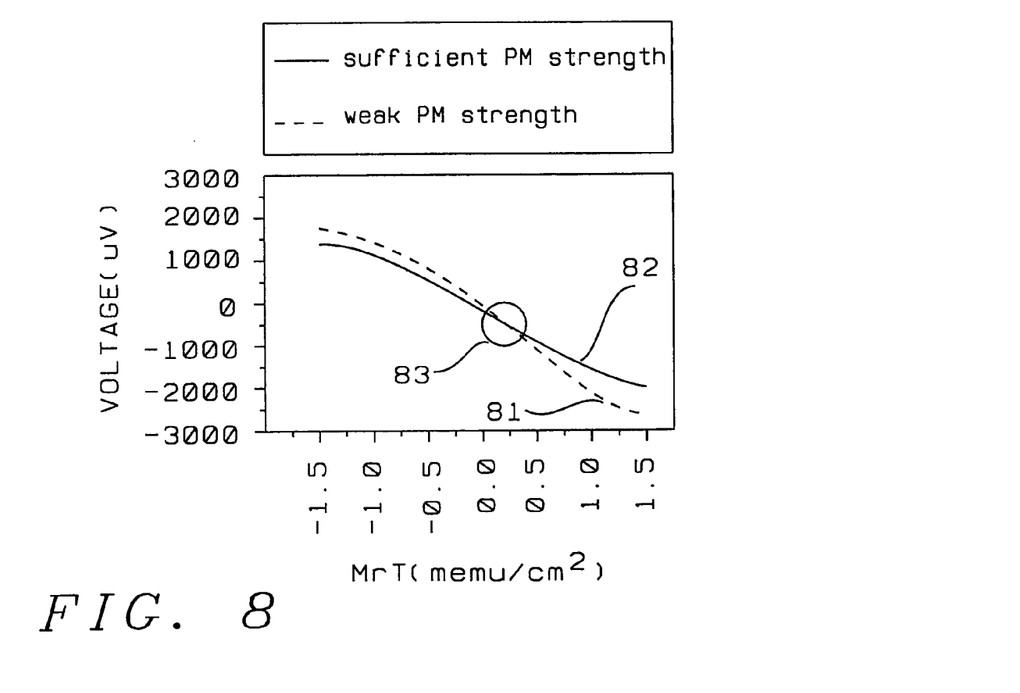
FIG. 8 plots voltage against total magnetic moment for structures with and without the thin film shield.

In FIGS. 7 and 8 we present data that confirms the effectiveness of the present invention. FIG. 7 illustrates the reduction in $PW_{50}$ that the present invention brings about. Shown there are micro-magnetic simulated playback waveforms. The cases involved are curve 71, conventional SV head with 800 Å shield-to-shield spacing (dashed), and curve 72 which is for double-sided thin film shields(solid), the free layer being located at the center of the two thin film shields. The spacing between the thin film shields is 300 Å. The total distance between the primary shields is about 1000 Å. The $M_rT$ (remnant magnetization×layer thickness=total magnetic moment) of both thin film shields is four times that of the free layer. The resistivity of the thin film shield is assumed to be nine times greater than that of the free layer. Simulation shows that the $PW_{50}$ for the conventional SV is about 700 Å while the $PW_{50}$ for the thin film shield head is about 550 Å, which is approximately equivalent to a 450 Å shield-to-shield space in the case without the thin film shields.

Since the thin film shields are magnetic materials, the fringe field from the shield layers will affect the performance of the free layer and cause instability if they are not properly biased. No additional bias scheme is needed for the continuous thin film shield. For the permanent magnet (PM) abutted scheme (FIGS. 2, 3, and 6 ), a permanent magnet is placed adjacent to both sides of the thin film shield to provide a horizontal bias along the track width direction, just as the free layer is given its bias. The highly localized PM field removes the magnetic charge at the ends of the thin film shield, while still keep the high permeability property of the shield layers.

From the curves shown in FIG. 7, the data displayed in TABLE II can be derived:

TABLE II

| structure | $PW_{50}$ (Å) | equivalent shield-to-shield spacing |
|---|---|---|
| no TF shield | 700 | 800 |
| with TF shield | 550 | 450 |

This shows that when the thin film shield disclosed in the present invention is used, the 550 Angstrom $PW_{50}$ that is obtained is equivalent to a shield-to-shield spacing of only 450 Angstroms.

FIG. 8 shows calculated transfer curves for the double-sided thin film shield for two different PM bias strength presented as voltage vs. total magnetic moment in milli-electromagnetic units. A "kink" 83 appears in the transfer curve where hard bias curve 81 for a field that is not strong enough crosses curve 82 which is for a field of adequate strength. Calculations show that a stability coefficient $(M_rT)_{PM}/(M_rT)_{TFS}$ of 1 is sufficient to provide the proper horizontal bias for the thin film shields.

Note that since the thin film shield is at least two times thicker than the free layer, the degree of the magnetization rotation in the thin film shield is usually much less than in the free layer. The magnetization in the thin film shield is essentially oriented along the track width direction. The change of the free layer bias level due to the flux from the shield layer is not significant. The effect of current field from the thin film shield layers on the bias is also negligible due to the high resistivity of the shield material.

While the invention has been particularly shown and described with reference to the preferred embodiments thereof, it will be understood by those skilled in the art that various changes in form and details may be made without departing from the spirit and scope of the invention.

What is claimed is:

1. A process for manufacturing a top spin valve structure, comprising:

providing a lower primary magnetic shield on which is a first dielectric layer;

on a selected area of said first dielectric layer, depositing a layer of conductive material for use as a connecting lead to the structure;

on the conductive lead material, selectively depositing a layer of a ferromagnetic material for use as an exchange magnet for providing longitudinal bias to the structure;

on said first dielectric layer and on the exchange magnet layer, depositing a layer of magnetic material for use as a free layer in said spin valve;

on the free layer depositing a layer of non-magnetic material;

on the layer of non-magnetic material, depositing a layer of magnetic material for use as a pinned layer in said spin valve;

on the pinned layer, depositing a layer of an anti-ferromagnetic material for use as a pinning layer in said spin valve, thereby completing formation of the top spin valve;

on the anti-ferromagnetic layer, depositing a layer of material for use as a decoupling layer;

on the decoupling layer, depositing a layer of high permeability ferromagnetic material, said material having an electrical resistivity greater than about 125 microohm-cm and a thickness such that the product of its moment and thickness is 2 to 5 times that of the free layer, thereby forming a thin film shield;

on the thin film shield, depositing a second dielectric layer; and on the second dielectric layer, depositing an upper primary magnetic shield.

2. The process described in claim 1 wherein the thin film shield is selected from the group consisting of nickel-iron-chromium, cobalt-niobium-zirconium, cobalt-niobium-hafnium, iron-cobalt-nitrogen, iron-cobalt-chromium, iron-cobalt-tantalum, and iron-cobalt-titanium and has a permeability greater than about 500.

3. The process recited in claim 1 wherein said decoupling layer is selected from the group consisting of TaO, NiCr, and NiFeCr.

4. The process recited in claim 1 wherein said decoupling layer is between 20 and 50 Angstroms thick.

* * * * *